(12) United States Patent
Kim et al.

(10) Patent No.: US 11,383,731 B2
(45) Date of Patent: Jul. 12, 2022

(54) IMAGE OUTPUT DEVICE

(71) Applicant: LG Electronics Inc., Seoul (KR)

(72) Inventors: Hyongguk Kim, Seoul (KR);
Hyeongjin Im, Seoul (KR); Jaehoon Cho, Seoul (KR); Heejeong Heo, Seoul (KR); Yoonjung Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 16/490,106

(22) PCT Filed: Jun. 4, 2019

(86) PCT No.: PCT/KR2019/006703
§ 371 (c)(1),
(2) Date: Aug. 30, 2019

(87) PCT Pub. No.: WO2020/246627
PCT Pub. Date: Dec. 10, 2020

(65) Prior Publication Data
US 2021/0354711 A1      Nov. 18, 2021

(51) Int. Cl.
  *B60W 50/14*      (2020.01)
  *B60K 35/00*      (2006.01)
  (Continued)

(52) U.S. Cl.
  CPC ............ *B60W 50/14* (2013.01); *B60K 35/00* (2013.01); *B60R 16/023* (2013.01); *B60W 40/08* (2013.01);
  (Continued)

(58) Field of Classification Search
  None
  See application file for complete search history.

(56) References Cited

U.S. PATENT DOCUMENTS 10,155,166 B1 * 12/2018 Taylor ..................... A63F 13/25
10,296,083 B2 *  5/2019 Sung ..................... G06F 3/1431
(Continued)

FOREIGN PATENT DOCUMENTS

CA      3057109 A1 *  9/2018 ............. G06F 3/013
CN    104932673 B  *  6/2018 ......... H04N 5/23218
(Continued)

OTHER PUBLICATIONS

KR Notice of Allowance in Korean Appln. No. 10-2019-7019952, dated Jan. 15, 2021, 11 pages (with English translation).
(Continued)

*Primary Examiner* — Fekadeselassie Girma
(74) *Attorney, Agent, or Firm* — Fish & Richardson P.C.

(57) ABSTRACT

Provided is an image output device mounted on a vehicle capable of performing autonomous driving. In particular, the image output device provides a user interface optimal for an occupant using 5G communication in a vehicle capable of performing autonomous driving. The image output device may be a robot having artificial intelligence. Specifically, the image output device includes: an image output unit; and a processor setting a screen in the vehicle on the basis of a gaze of an occupant riding in the vehicle, and controlling the image output unit to output an image corresponding to the screen, wherein at least one of a size and a ratio of the image is varied according to the screen.

19 Claims, 13 Drawing Sheets

(51) Int. Cl.
  *B60R 16/023* (2006.01)
  *B60W 40/08* (2012.01)
  *G06F 3/01* (2006.01)

(52) U.S. Cl.
  CPC ..... *G06F 3/013* (2013.01); *B60W 2040/0881* (2013.01); *B60W 2420/42* (2013.01); *B60Y 2400/30* (2013.01)

(56) References Cited

U.S. PATENT DOCUMENTS

| | | | | |
|---|---|---|---|---|
| 2014/0049462 A1* | 2/2014 | Weinberger | ............. | G06F 3/013 345/156 |
| 2018/0174463 A1* | 6/2018 | Ohta | ....................... | G02B 27/01 |
| 2021/0208409 A1* | 7/2021 | Hong | ..................... | B60K 35/00 |

FOREIGN PATENT DOCUMENTS

| | | | | | |
|---|---|---|---|---|---|
| CN | 108694693 A | * | 10/2018 | ......... | G06K 9/00315 |
| EP | 3330117 A1 | * | 6/2018 | ............. | G06T 11/60 |
| JP | 2005067509 | | 3/2005 | | |
| JP | 4096151 B2 | * | 6/2008 | ..... | G02B 15/144113 |
| JP | 5992130 | | 9/2016 | | |
| JP | 2018106052 | | 7/2018 | | |
| KR | 1020090083988 | | 8/2009 | | |
| KR | 1020150062317 | | 6/2015 | | |
| KR | 20170015213 A | * | 2/2017 | ............ | B60W 50/14 |
| KR | 1020170015213 | | 2/2017 | | |
| KR | 1020170048781 | | 5/2017 | | |
| KR | 20180115140 A | * | 10/2018 | ............ | B60W 50/14 |
| TW | 201103007 A | * | 1/2011 | ......... | G06K 9/00604 |
| WO | WO2016188545 | | 12/2016 | | |
| WO | WO-2016188545 A1 | * | 12/2016 | .......... | B60N 2/0244 |
| WO | WO-2018061444 A1 | * | 4/2018 | ............ | B60R 11/02 |

OTHER PUBLICATIONS

Korean Office Action in Korean Application No. 10-2019-7019952, dated Jun. 30, 2020, 16 pages (with English translati on).

* cited by examiner

IMAGE OUTPUT DEVICE

CROSS-REFERENCE TO RELATED APPLICATIONS

This application is the National Stage filing under 35 U.S.C. 371 of International Application No. PCT/KR2019/006703 filed on Jun. 4, 2019, which is incorporated by reference.

TECHNICAL FIELD

The present invention relates to an image output device, and more particularly, to an image output device mounted on a vehicle and providing various visual information to an occupant.

BACKGROUND ART

A vehicle refers to means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

In order to further improve the convenience functions and the safety functions, a vehicle-specific communication technology is being developed. For example, a vehicle to infrastructure (V2I) that enables communication between a vehicle and an infrastructure, a Vehicle to Vehicle (V2V) that enables communication between vehicles, a Vehicle to Everything (V2X) that enables communication between a vehicle and an object, and the like.

A vehicle includes an image output device for visually providing various information to an occupant. The image output device includes a head-up display (HUD) for outputting information to a windshield of a vehicle or a separately provided transparent screen and/or various displays for outputting information through a panel.

The image output device provides information guiding a route to a destination and information on a point of interest (POI) and evolves to effectively provide various information. In particular, research on an image output device optimized for an occupant who sits on a specific seat.

DISCLOSURE

Technical Problem

Therefore, an object of the present invention is to solve the above and other problems.

Another object of the present invention is to provide an image output device capable of providing visual information to a place viewed by an occupant, a control method thereof, and a vehicle including the same.

Technical Solution

In an aspect, the present invention provides an image output device mounted on a vehicle.

The image output device includes: an image output unit; and a processor setting a screen in the vehicle on the basis of a gaze of an occupant who rides in the vehicle, and controlling the image output unit to output an image corresponding to the screen, wherein at least one of a size and a ratio of the image is varied according to the screen.

According to an embodiment, the processor may variably set a size of the screen on the basis of an object viewed by the occupant.

According to an embodiment, the image output device may further include a sensor generating sensing information related to the object, wherein the processor may set an area that satisfies a reference condition using the sensing information as the screen.

According to an embodiment, the sensing information may include an object image corresponding to the object, and the processor may search for one or more rectangular areas that may be recognized as a two-dimensional plane by the occupant using the object image and set any one of the one or more rectangular areas as the screen.

According to an embodiment, the image output device may further include a communication unit communicating with a sensor mounted in the vehicle to generate sensing information related to the object, wherein the processor may set an area satisfying a reference condition using the sensing information as the screen.

According to an embodiment, the image output device may further include: a camera, wherein an image output area in which an image is output may be searched by using the camera image received from the camera, and the image output area may be controlled such that the image output area is rectangle.

According to an embodiment, the screen may be varied according to a seat position of a seat on which the occupant sits.

According to an embodiment, the processor may generate a control command such that the seat position of the seat on which the occupant sits is changed on the basis of the screen.

According to an embodiment, the processor may calculate a distance between the image output unit and the screen and control the image output unit so that a size of a graphic object included in the image is varied according to the distance.

According to an embodiment, the image output device may further include: a communication unit communicating with a plurality of sensors mounted in the vehicle, and the processor may select at least one sensor tracking a gaze of the occupant from among the plurality of sensors, and the at least one sensor may be varied according to the seat position of the seat on which the occupant sits.

According to an embodiment, the vehicle may include a first sensor and a second sensor installed at different positions and tracking a gaze of the occupant, and the processor may set the screen using sensing information received from the first sensor if the seat position satisfies a first condition, and set the screen using sensing information received from the second sensor if the seat position satisfies a second condition.

According to an embodiment, the first condition and the second condition may be defined by at least one of a position of the seat in the vehicle and an angle between a first portion of the seat where the butt of the occupant touches and a second portion of the seat where the back of the occupant touches.

According to an embodiment, the first sensor may be disposed on a front side in the vehicle and the second sensor may be disposed on a rear side in the vehicle.

According to an embodiment, the vehicle may include a first sensor and a second sensor for tracking a gaze of the occupant, and the processor may detect a gaze of the occupant using first sensing information generated by the first sensor, and detect the gaze of the occupant using second sensing information generated by the second sensor if a gaze of the occupant is not detected from the first sensing information.

According to an embodiment, the image output device may further include: a communication unit receiving vehicle driving information from one or more electronic devices mounted on the vehicle, and the processor may reset the screen on the basis of the vehicle driving information and control the image output unit to output the image on the reset screen.

According to an embodiment, the processor may generate a control command on the basis of the reset screen such that the seat position of the seat on which the occupant sits is changed.

According to an embodiment, the image output device may be installed on a head rest of the seat on which the occupant sits.

According to an embodiment, the vehicle may include a first seat on which the occupant sits and a second seat on which the occupant does sit, and the processor may generate a control command such that a seat position of the second seat is changed if the screen is formed on the second seat.

According to an embodiment, the seat position of the second seat may be varied according to a gaze of the occupant.

According to an embodiment, the processor may limit generation of the control command if a person sits on the second seat.

Advantageous Effect

The effects of the image output device according to the present invention are as follows.

According to the present invention, since a screen in which at least one of a size and a shape is varied is set in an area viewed by an occupant and visual information is provided through the variable screen, user convenience may be increased as compared with the case of using a physically fixed display.

The occupant who rides in a vehicle may be provided with visual information, while sitting in his seat, and a seat position of the seat may be freely deformed according to the intention of the occupant. Since the image output device according to the present invention provides a screen optimal for the occupant regardless of the seat position, the occupant may be provided with visual information in a comfortable posture.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
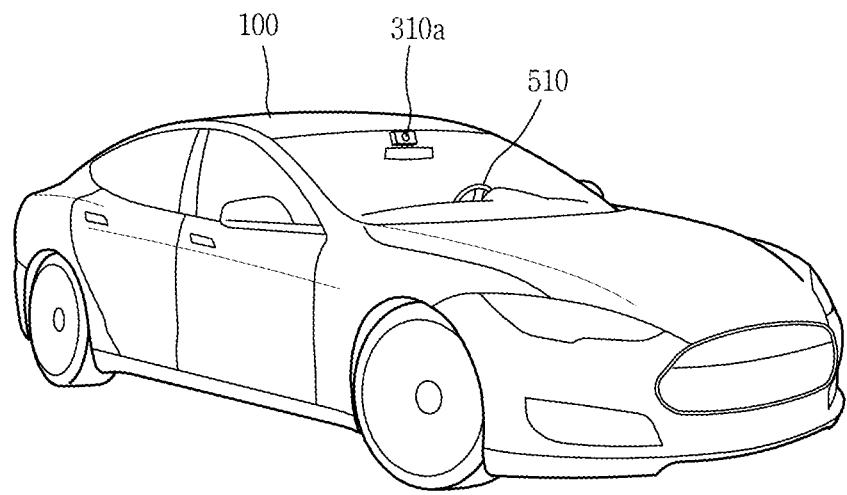
FIG. 1 is a view illustrating appearance of a vehicle in accordance with an embodiment of the present invention.
Figure 1:
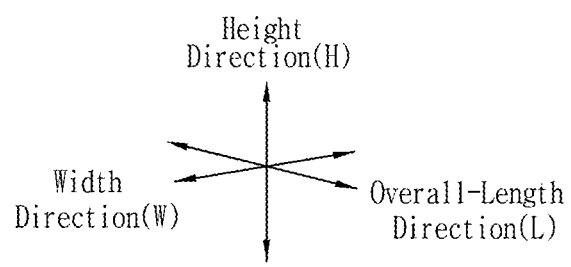

FIG. 1 is a view illustrating appearance of a vehicle in accordance with an embodiment of the present invention.

Figure 2:
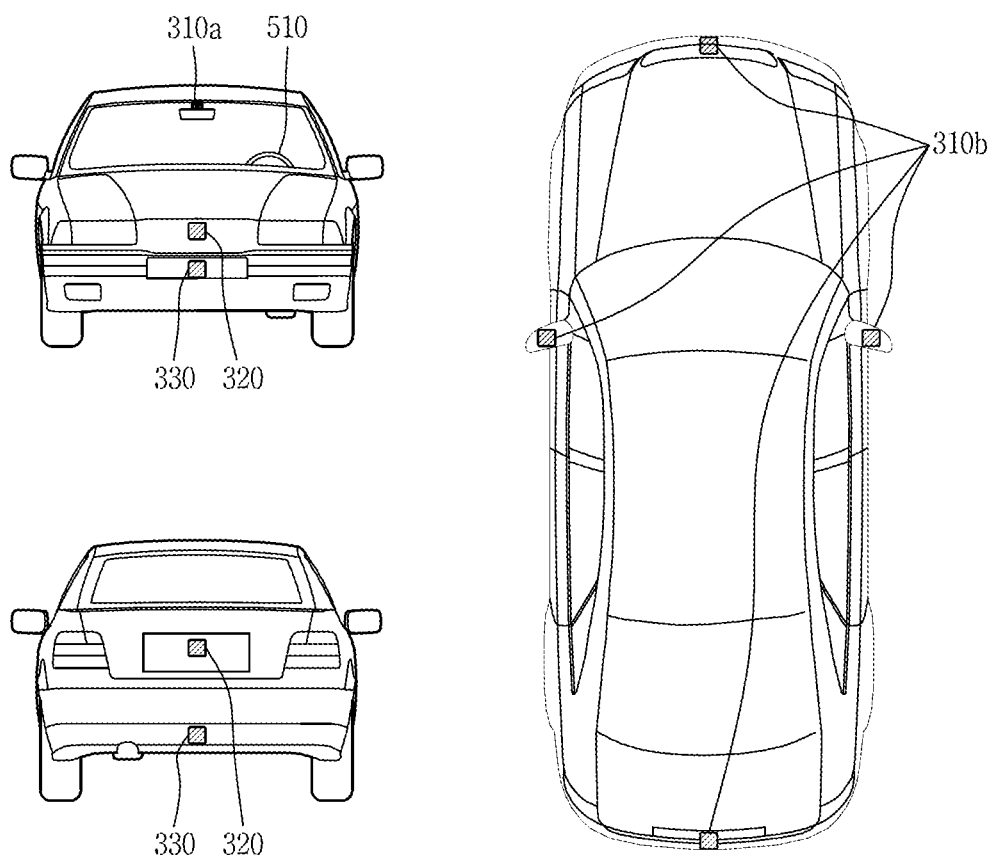
FIG. 2 is a view illustrating appearance of a vehicle at various angles in accordance with an embodiment of the present invention.

FIG. 2 is a view illustrating appearance of a vehicle at various angles in accordance with an embodiment of the present invention.

Figure 3:
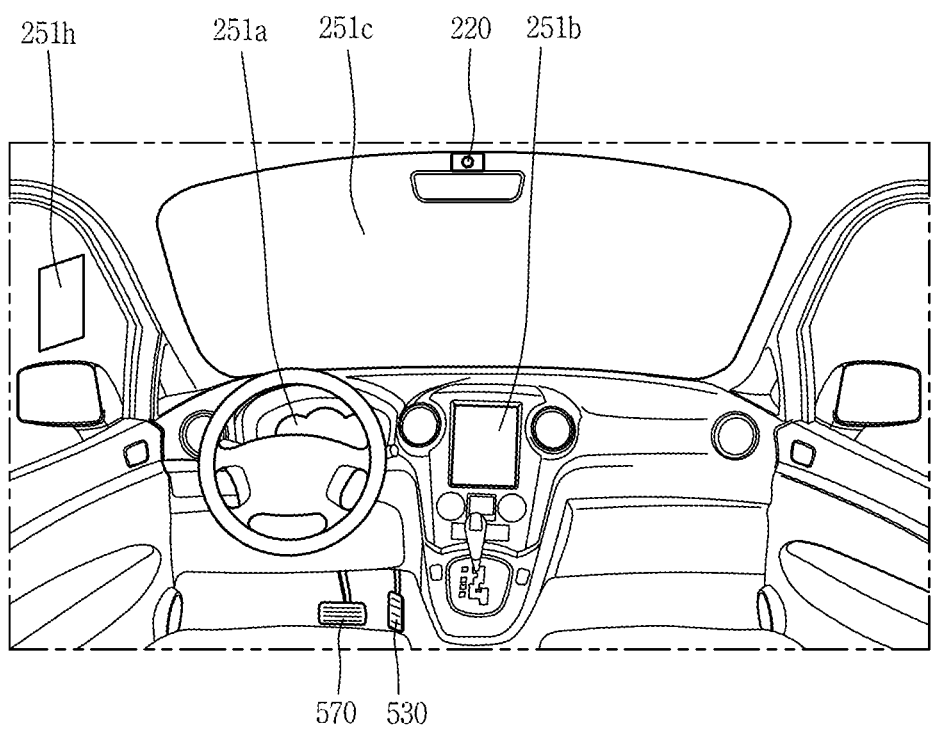
FIGS. 3 and 4 are views illustrating an inside of a vehicle in accordance with an embodiment of the present invention.
Figure 4:
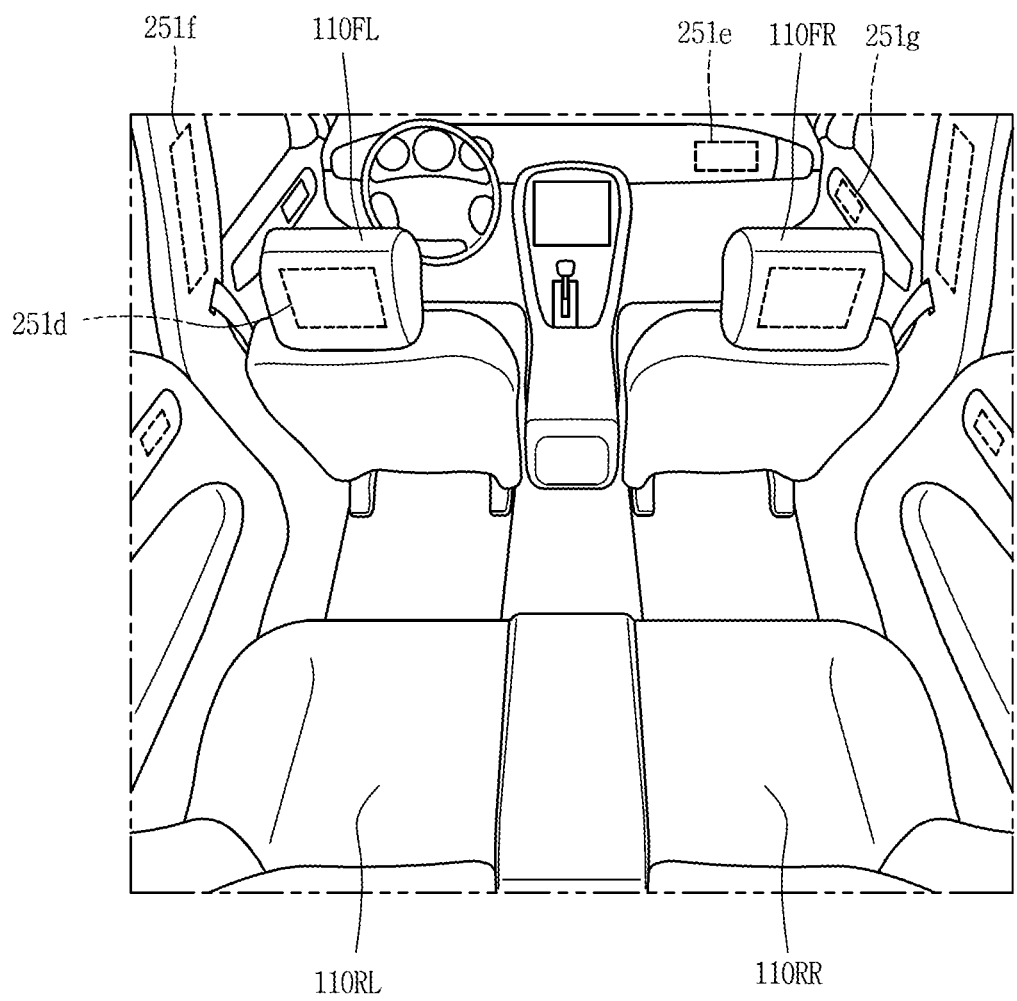

FIGS. 3 and 4 are views illustrating an inside of a vehicle in accordance with an embodiment of the present invention.

Figure 5:
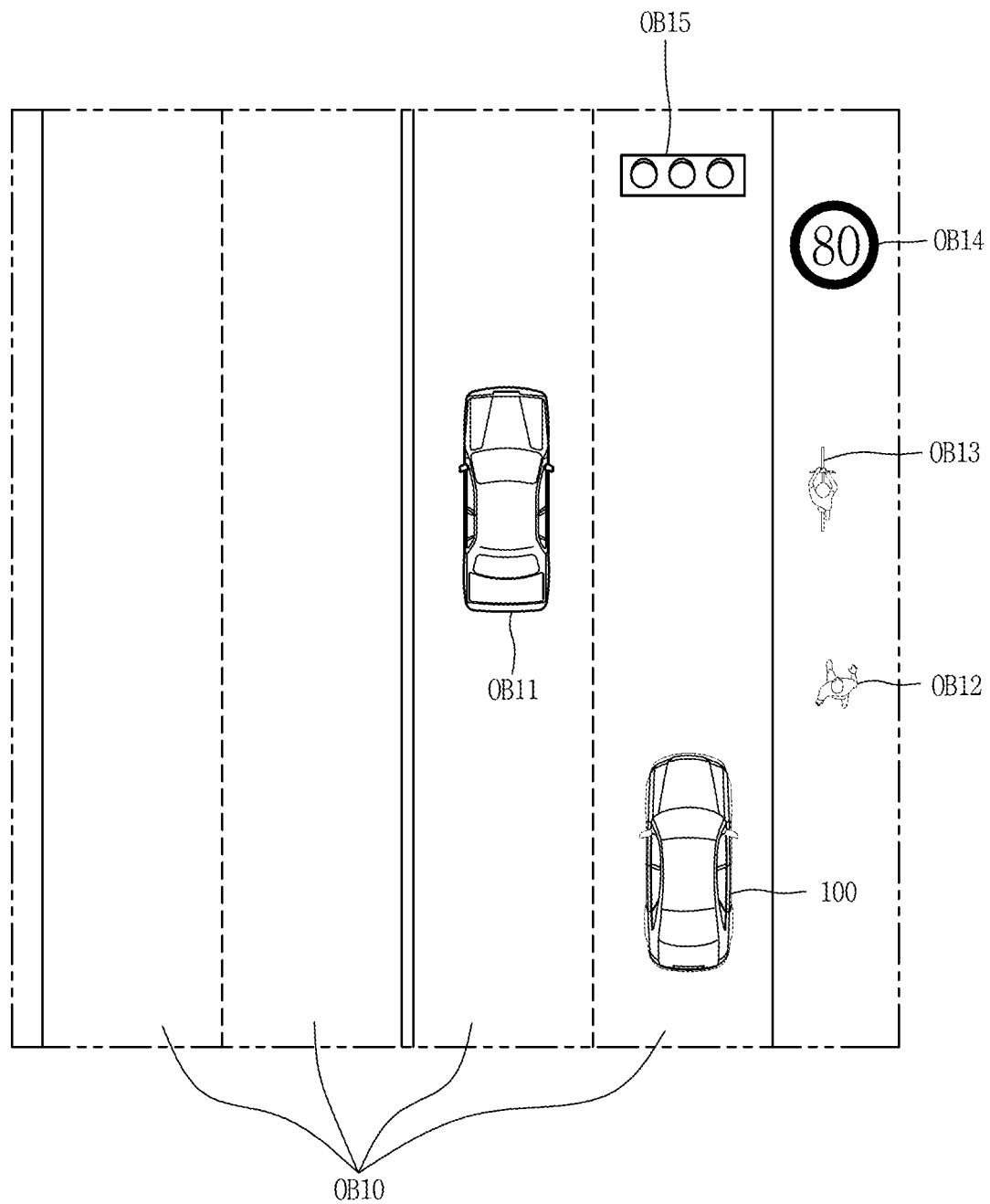
FIGS. 5 and 6 are reference views illustrating objects in accordance with an embodiment of the present invention.
Figure 6:
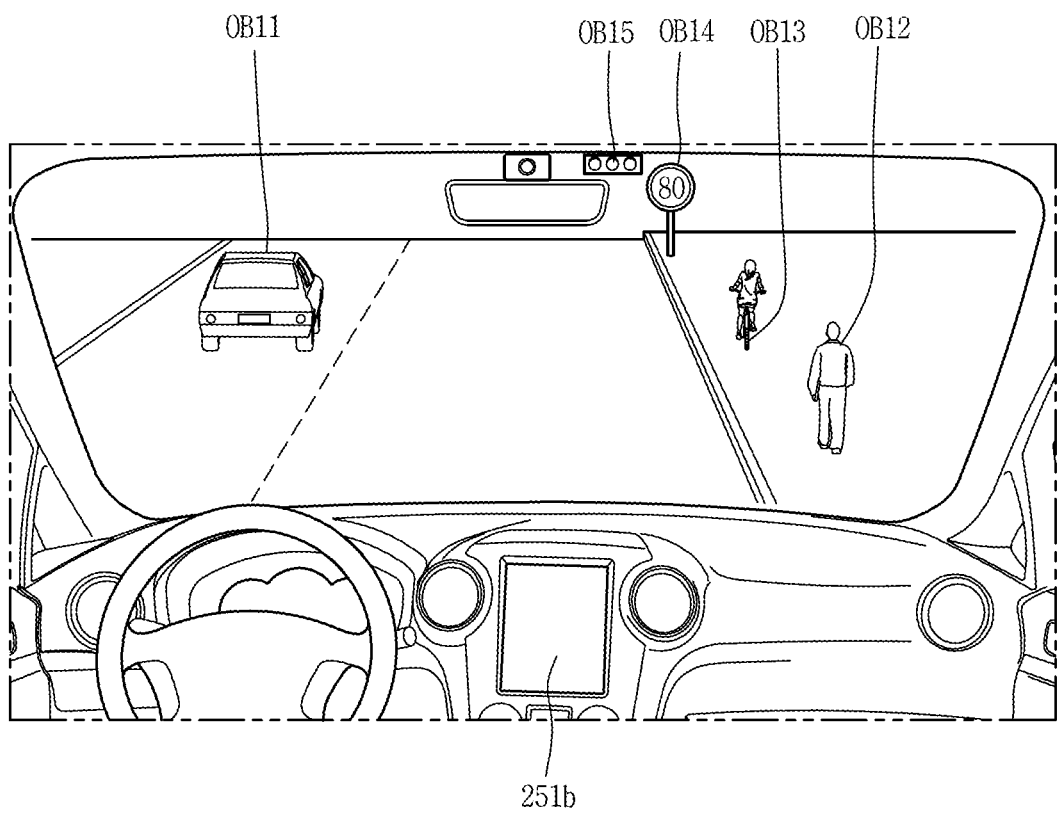

FIGS. 5 and 6 are reference views illustrating objects in accordance with an embodiment of the present invention.

Figure 7:
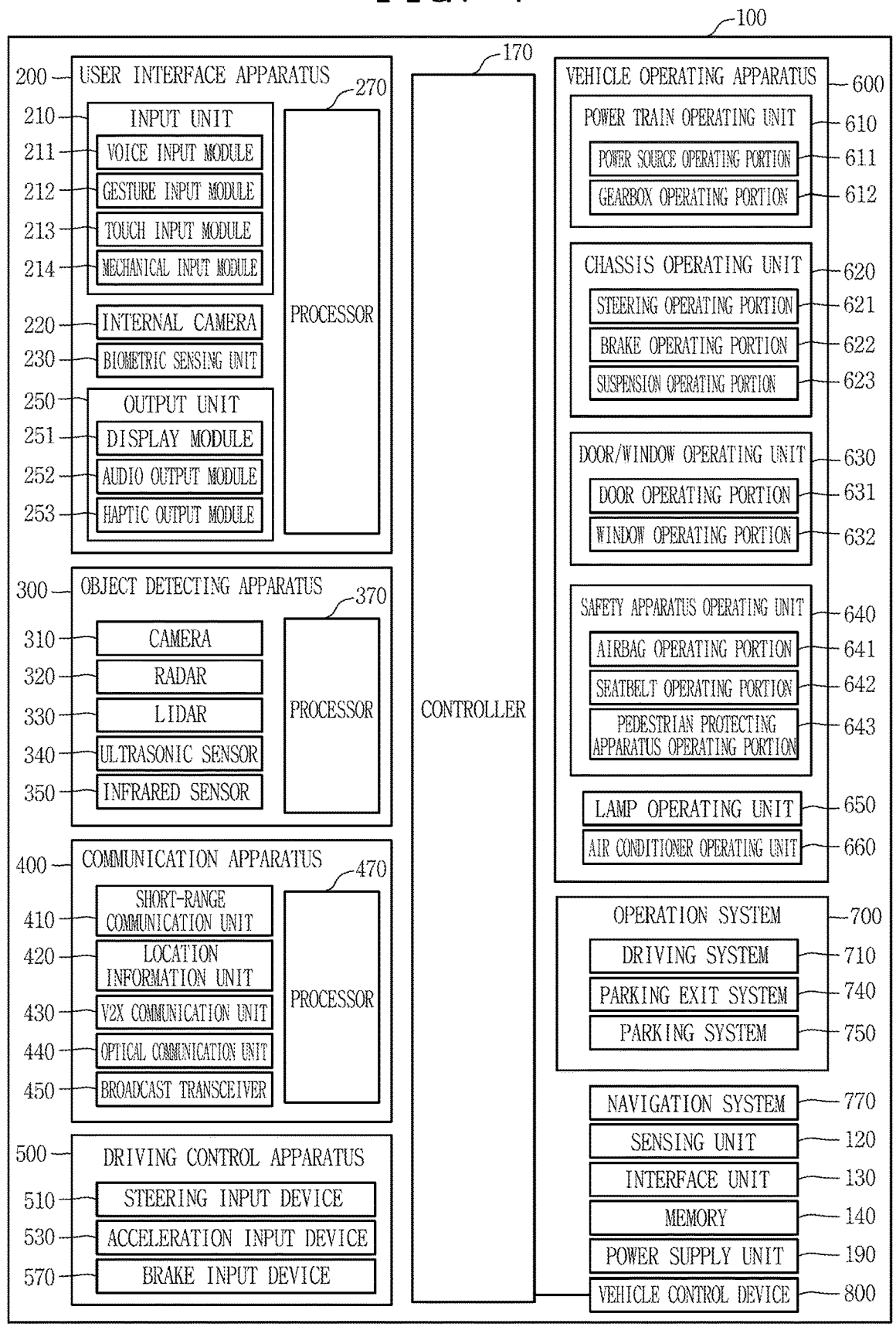
FIG. 7 is a block diagram illustrating a vehicle in accordance with an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

Here, the autonomous driving is defined as controlling at least one of acceleration, deceleration, and driving direction based on a preset algorithm. In other words, the autonomous driving refers to that a driving control apparatus is automatically manipulated even without a user input applied to the driving control apparatus.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 200 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251*a* to 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground.

For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian.

The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication device 400 may be referred to as a 'wireless communication unit'.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine.

Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, an image output device 800 provided in the vehicle 100 will be described in detail.

The image output device 800 is provided in the vehicle 100, and may be formed as an independent device detachable from the vehicle 100 or may be integrally installed in the vehicle 100 so as to be a part of the vehicle 100.

An operation and control method of the image output device 800 described in this disclosure may be performed by the controller 170 of the vehicle 100. That is, an operation and/or control method performed by the processor 870 of the image output device 800 may be performed by the controller 170 of the vehicle 800.

Figure 8:
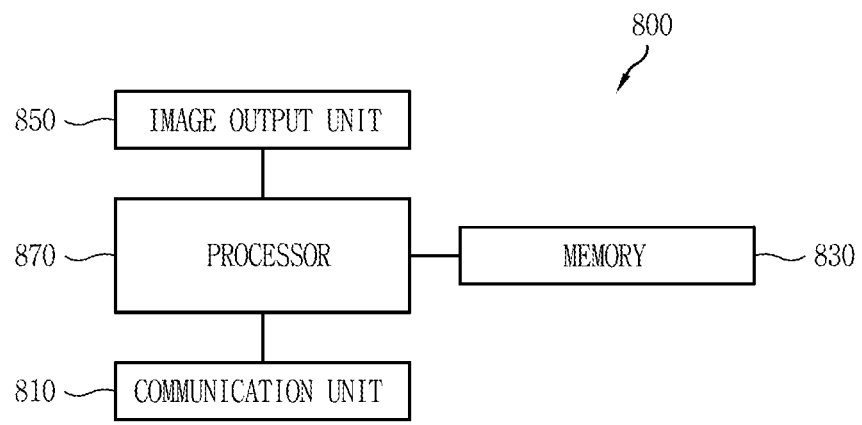
FIG. 8 is a conceptual view illustrating an image output device according to an embodiment.

Referring to FIG. 8, the image output device 800 includes a communication unit 810, a memory 830, an image output unit 850, and a processor 830.

The communication unit 810 is configured to communicate with various components described with reference to FIG. 7. For example, the communication unit 810 may receive various information provided through a controller area network (CAN). As another example, the communication unit 810 may communicate with all devices that may communicate, such as a vehicle, a mobile terminal and a server, and another vehicle. This may be referred to as vehicle to everything (V2X) communication. V2X communication may be defined as a technology that exchanges or shares information such as traffic conditions, while communicating with a road infrastructure and other vehicles while driving.

The communication unit 810 is configured to communicate with one or more devices provided in the vehicle 100.

In addition, the communication unit 810 may receive information related to driving of the vehicle from most devices provided in the vehicle 100. Information transmitted from the vehicle 100 to the image output device 800 is called 'vehicle driving information'.

The vehicle driving information includes vehicle information and surrounding information of the vehicle. With reference to a frame of the vehicle 100, information related to the inside of the vehicle may be defined as vehicle information and information related to the outside of the vehicle may be defined as surrounding information.

Vehicle information refers to information regarding a vehicle itself. For example, vehicle information may include a driving speed of a vehicle, a running direction, acceleration, an angular velocity, a position (GPS), a weight, the number of occupants in a vehicle, braking power of a vehicle, maximum braking power of a vehicle, pressure of each wheel, centrifugal force applied to a vehicle, a running mode of a vehicle (whether the vehicle is in an autonomous driving mode or a manual driving mode), a parking mode of a vehicle (autonomous parking mode, autonomic parking mode, manual parking mode), whether a user rides in a vehicle, information related to a user, and the like.

The surrounding information refers to information regarding another object positioned within a predetermined range around a vehicle and information related to the outside of a vehicle. For example, the surrounding information may be a state (frictional force) of a road surface on which the vehicle is driving, weather, a distance to a preceding vehicle (or subsequent vehicle), a relative speed of a preceding vehicle (or a subsequent vehicle), a bending rate of a curve when a lane in which the vehicle is driving is a curve, brightness around the vehicle, information related to an object present within a reference region (predetermined region) with respect to the vehicle, whether an object enters/leaves the predetermined region, whether a user is present in the vicinity of the vehicle, information related to the user (e.g., whether the user is an authenticated user or not), and the like.

Also, the surrounding information may include ambient brightness, temperature, a location of the sun, information of an object positioned nearby ((person, another vehicle, a sign, etc.), a type of a road surface on which the vehicle is driving, a geographic feature, line information, or lane information in which the vehicle is driving, and information required for autonomous driving/autonomous parking/automatic parking/manual parking mode.

Also, the surrounding information may further include a distance between an object present in the vicinity of the vehicle 100 and the vehicle 100, a possibility of collision, a type of the object, a parking space in which the vehicle may park, an object (e.g., a parking line, a string, another vehicle, a wall, etc.) for identifying the parking space, and the like.

The vehicle driving information is not limited to the examples described above and may include every information generated from components provided in the vehicle 100.

The memory 830 may store an operating system, middleware, an application, etc. required to drive the image output device. The memory 830 may be replaced with a server (or a cloud) that performs communication through the communication unit 810.

The image output unit 850 outputs various visual information under the control of the processor 870. The image output unit 850 may output visual information to a windshield or a separate screen of the vehicle or output visual information through a panel. The image output unit 850 may correspond to the display unit 251 described with reference to FIGS. 1 to 7.

The processor 830 performs various operations of the image output device 800, which will be described later, and controls the communication unit 810, the memory 830, and the image output unit 850.

The processor 830 may be configured to control one or more devices provided in the vehicle 100 using the communication unit 810.

In detail, the processor 830 may determine whether at least one of a plurality of preset conditions is satisfied on the basis of vehicle driving information received through the communication unit 810. Depending on the satisfied condition, the processor 807 may control the one or more displays in different ways.

In relation to the preset condition, the processor 870 may detect that an event occurs in an electronic device and/or application provided in the vehicle 100, and determine whether the detected event satisfies the preset condition. In this case, the processor 870 may detect that an event has occurred from information received through the communication unit 810.

The application is a concept including a widget, a home launcher, etc., and refers to any type of program that may be driven in the vehicle 100. Therefore, the application may be a program that performs functions of a web browser, video playback, message transmission and reception, schedule management, and application updating.

Furthermore, the application may include at least one of forward collision warning (FCW), blind spot detection (BSD), lane departure warning (LDW), pedestrian detection (PD), and curve speed warning (CSW), and turn by turn navigation (TBT).

For example, the occurrence of an event may correspond to a case where there is a missed call, a case where there is an application to be updated, a case where a message arrives, start on, start off, autonomous driving on/off, display activation key is pressed (LCD awake key), alarm, incoming call, missed notification, and the like.

As another example, the occurrence of an event may correspond to a case where an alert set in an advanced driver assistance system (ADAS) occurs and a case where a function set in the ADAS is performed. For example, it is considered that an event occurs when a forward collision warning occurs, when a blind spot detection occurs, when a lane departure warning occurs, when a lane keeping assist warning occurs, and when autonomous emergency braking occurs.

As another example, it is also considered that an event occurs when a forward gear is switched to a reverse gear, when an acceleration greater than a predetermined value occurs, when a deceleration greater than a predetermined value occurs, when a power device is switched from an internal combustion engine to a motor, or when a power device is switched from the motor to the internal combustion engine.

In addition, it is also considered that an event occurs even when various ECUs provided in the vehicle 100 perform a specific function.

When the generated event satisfies a preset condition, the processor 870 controls the communication unit 810 to display information corresponding to the satisfied condition on the one or more displays.

The processor 870 may transmit an autonomous driving message to at least one of a plurality of devices provided in the vehicle 100 to allow autonomous driving in the vehicle 100. For example, the autonomous driving message may be transmitted to a brake to decelerate, or the autonomous driving message may be transmitted to a steering device so that a driving direction is changed.

Hereinafter, an operation of the image output device 800 will be described in more detail with reference to the accompanying drawings.

Figure 9:
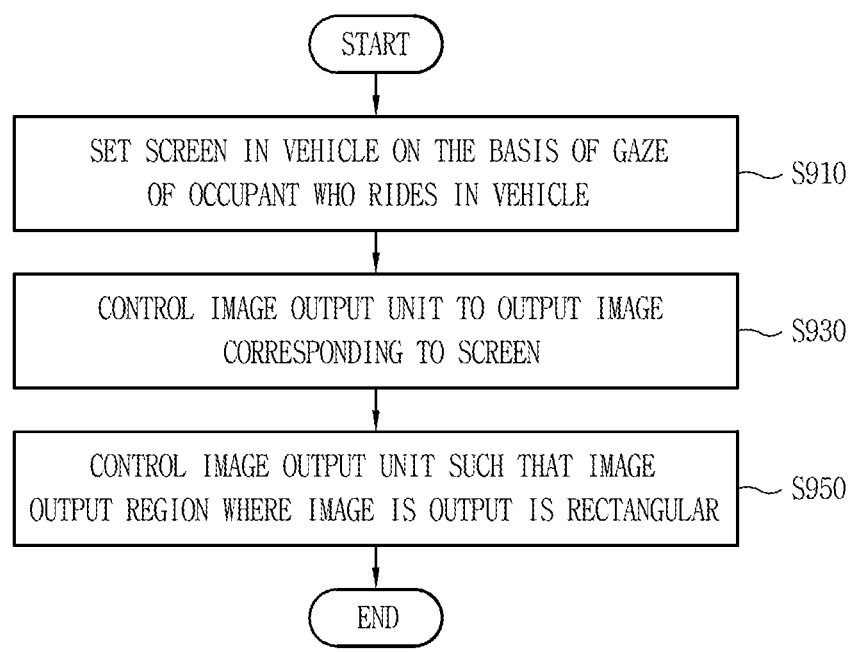
FIG. 9 is a flowchart illustrating a control method of an image output device.

FIG. 9 is a flowchart illustrating a control method of an image output device, and FIGS. 10A, 10B, 11A, and 11B are diagrams illustrating the control method of FIG. 9. Further, FIG. 12 is a view illustrating a method of changing an angle of a screen.

The processor 870 may set a screen in the vehicle 100 on the basis of a gaze of an occupant who rides in the vehicle (S910).

The processor 870 may track a gaze of the occupant who rides in the vehicle 100 using a sensor provided in the image output device 800 and/or a sensor provided in the vehicle 100.

In addition, the processor 870 may set a screen inside the vehicle 100 on the basis of the gaze of the occupant.

The screen refers to an area where an image is output by the image output unit 850. At least one of a size, position, and shape of the screen is varied according to the gaze of the occupant.

The processor 870 sets the screen on an object viewed by the occupant. The processor 870 may variably set the size of the screen on the basis of the object viewed by the occupant.

Figure 10A:
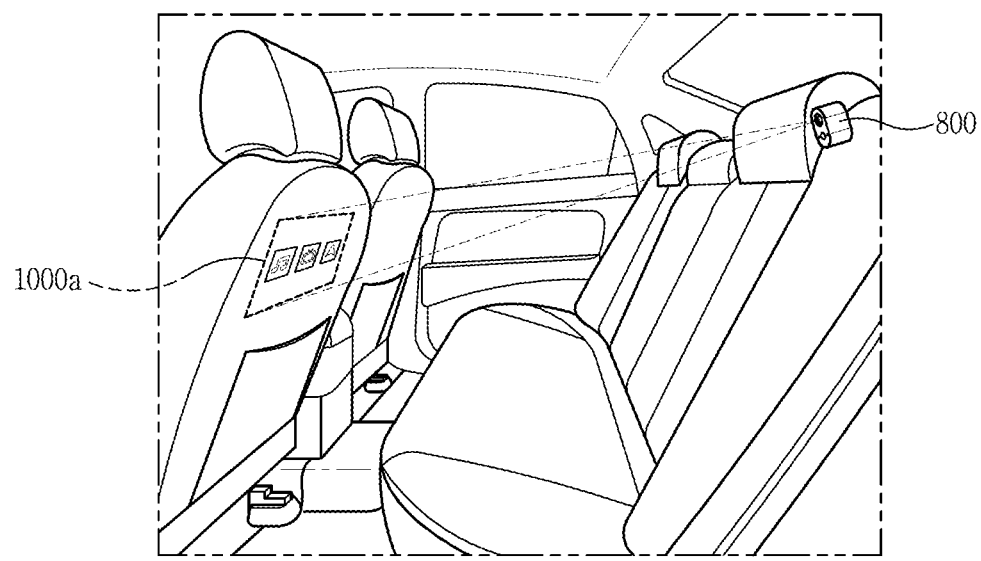
FIGS. 10A, 10B, 11A, and 11B are views illustrating the control method of FIG. 9.

For example, as shown in FIG. 10A, when the occupant views the back of the front seat, a screen 1000a is set on the backrest of the front seat. Here, a screen having a size that may be maximized on the backrest is set. Although not shown in the drawing, when the occupant views a headrest of the front seat, a screen is set on the headrest. Since a size of the headrest is small compared to the backrest, a smaller screen size is set on the headrest when the occupant views the backrest.

Figure 11A:
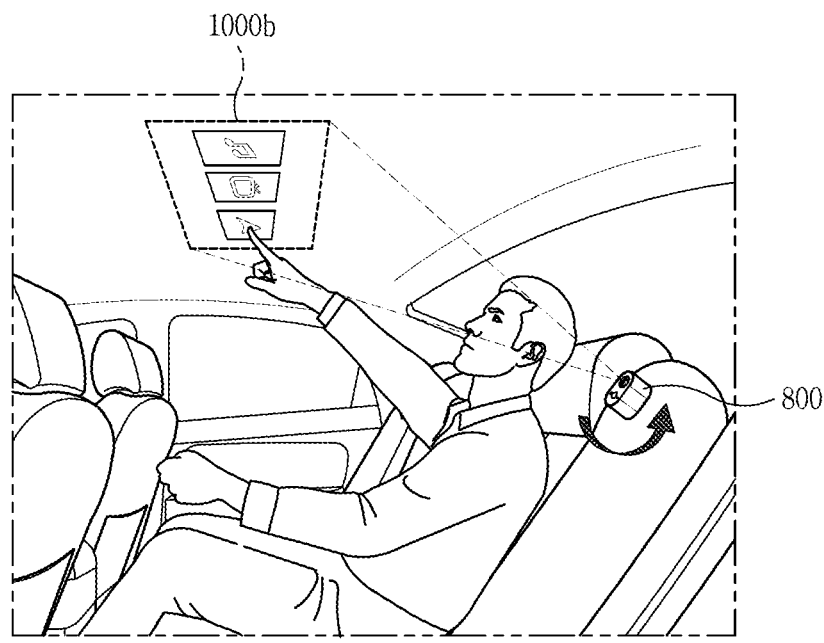
Figure 12:
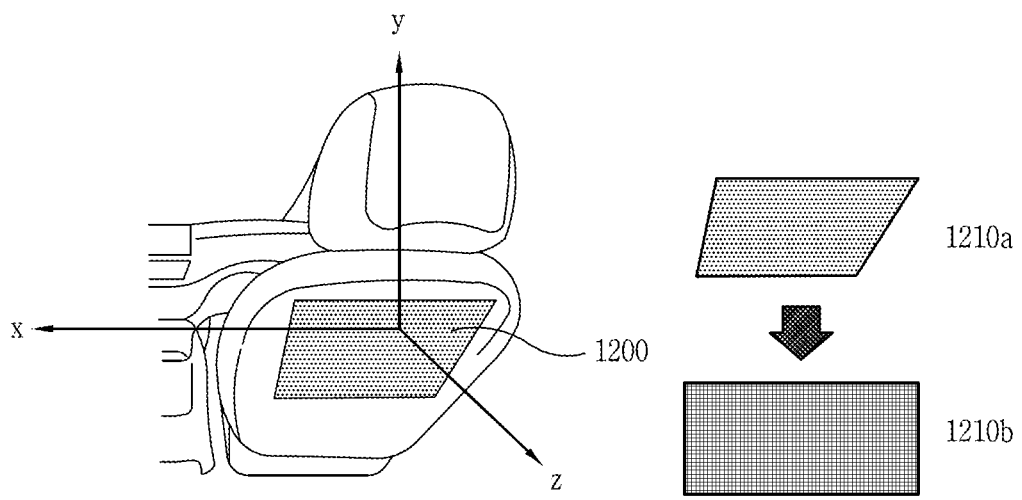
FIG. 12 is a view illustrating a method of changing an angle of a screen.

In another example, as illustrated in FIG. 11A, when the occupant views the ceiling of the vehicle 100, the screen 1000b may be set on the ceiling. In this case, a distance between the image output unit 800 and the screen 1000b may be calculated, and a screen 1000b having an optimized size for the occupant may be set on the basis of the distance.

An object viewed by the occupant, that is, the gaze of the occupant, may be varied depending on a seat position of the seat on which the occupant sits. As a result, the screen may be varied according to a seat position of the seat in which the occupant is riding.

Figure 10B:
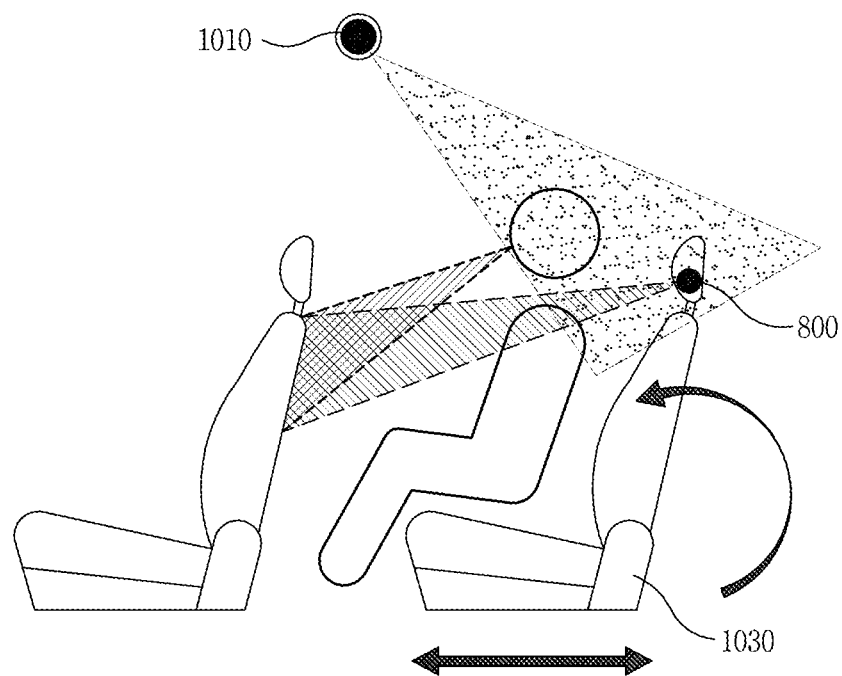
Figure 11B:
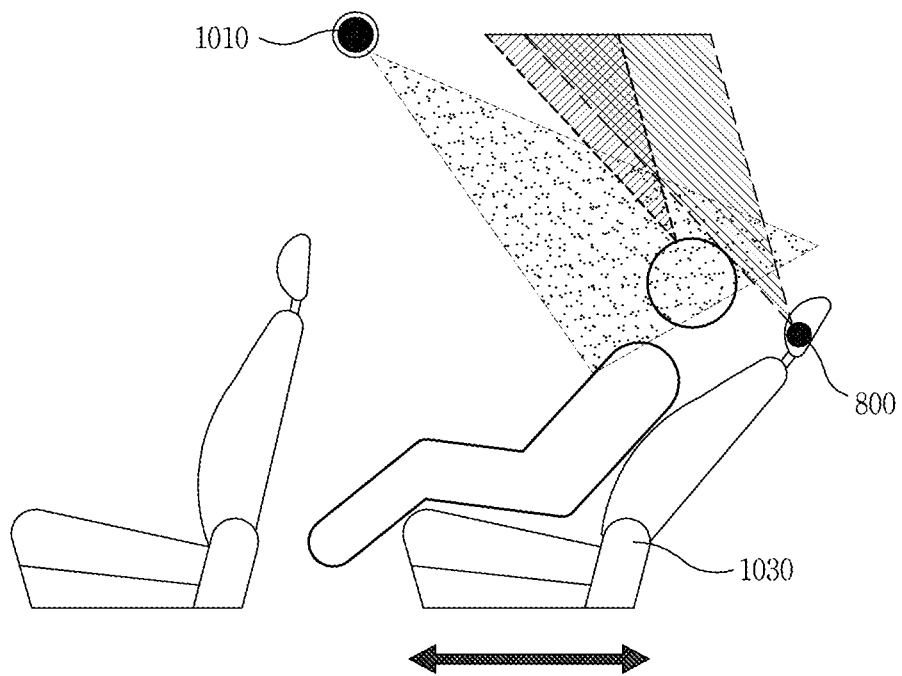

For example, as shown in FIG. 10B, when s seat position of the seat 1030 is in a first state, the screen 1000a is set on the back of the front seat, but as shown in FIG. 11B, when the seat position of the seat 1030 is in a second state, the screen 1000a is set on the ceiling.

The seat may move forward and backward of the vehicle or rotate on the basis of a direction of gravity, or the backrest of the seat may rotate back and forth. A state of the backrest and the like constituting the seat may be defined as a seat position. The seat position may be determined by at least one of a position of the center point of the seat, an angle between a first portion of the seat where the hips of the occupant touches and a second portion of the seat where the back of the occupant touches, and a direction in which the backrest of the seat faces.

The processor 870 may receive sensing information related to an object viewed by the occupant from the sensor and set an area that satisfies the reference condition as the screen using the sensing information.

The sensing information may include an object image corresponding to the object. The processor 870 may search for one or more quadrangular areas that may be perceived by the occupant as a two-dimensional plane by using the object image and set one of the one or more quadrangular areas as the screen. The processor 870 may search for a two-dimensional plane and set any one rectangular area satisfying the reference condition as a screen.

The sensor for generating the sensing information may be provided in the image output device 800 or may be provided as a separate device independent of the image output device 800 in the vehicle 100.

Next, the processor 870 may control the image output unit 850 to output an image corresponding to the screen (S930).

The screen is set in an area viewed by the occupant. The image output device 800 may be installed on the head rest of the seat on which the occupant sits in the same direction as a gaze of the occupant so that the image may be output on the screen. A component of the image output device 800, for example, the image output unit 850 may be installed on the head rest of the seat on which the occupant sits.

A size of a graphic object included in the screen may be varied according to a size of the screen. Further, the processor 870 may calculate a distance between the image output unit 850 and the screen and control the image output unit 850 so that the size of the graphic object included in the image is varied according to the distance.

Next, the processor 870 may control the image output unit 850 such that an image output area where the image is output is rectangular (S950).

Specifically, the processor 870 may receive a camera image captured by the camera from the camera capturing the screen and search for an image output area, that is, a screen, on which the image is output using the camera image. The processor 870 may control the image output unit such that the image output area is rectangular.

For example, as shown in FIG. 12, a screen may be generated on the backrest of the front seat. The angle of the screen with respect to the ground depends on a seat position of the front seat. The processor 870 may calculate an angle of the screen with respect to the ground or calculate an angle between the screen and the gaze in consideration of a direction in which the screen faces and the gaze of the occupant.

The processor 870 may control the image output unit such that the image output area is rectangular by using the camera image on the basis of the angle between the screen and the gaze. For example, by correcting a tweak of the image, the image viewed by the occupant may be recognized in a rectangular form.

As described above, the processor 870 may set a screen in which at least one of a size and a shape is varied in an area viewed by the occupant who rides in the vehicle 100 and provide visual information through the variable screen. User convenience is increased as compared to the case of using a physically fixed display.

The occupant who rides in the vehicle should be provided with visual information while sitting in his seat, and a seat position of the seat may be freely transformed according to an intention of the occupant. Since the image output device according to the present invention provides an optimal screen to the occupant regardless of the seat position, the occupant may be provided with visual information in a comfortable posture.

Figure 13:
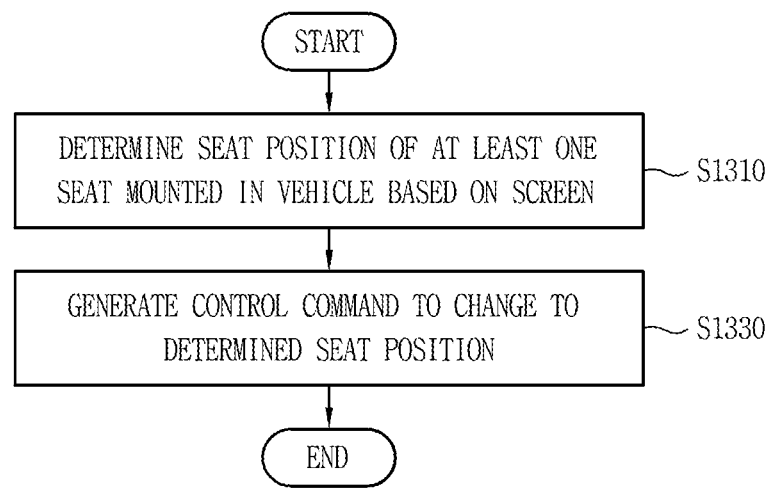
FIG. 13 is a flowchart illustrating a method for generating a control command so that a seat position is changed.

FIG. 13 is a flowchart illustrating a method of generating a control command so that the seat position is changed.

The processor 870 may determine a seat position of at least one seat mounted in the vehicle on the basis of the screen (S1310).

An optimal screen and a corresponding seat position may be stored in the memory 830 according to the object viewed by the occupant. For example, if the object is a backrest, a first seat position optimized for the backrest may be previously set, and when the object is a ceiling, a second seat position optimized for the ceiling may be previously set. The processor 870 may search for a preset seat position corresponding to the object and determine the searched seat position.

The processor 870 may determine at least one of a seat position of the seat on which the occupant sits and/or a seat position of the seat on which the screen is set.

For example, the vehicle may include a first seat on which the occupant sits and a second seat on which the occupant does sit. The processor 870 may generate a control command to change the seat position of the second seat when the screen is formed on the second seat. The seat position of the second seat is varied according to a gaze of the occupant. This is because at least one of the size, position, and shape of the screen is varied according to the gaze.

The processor 870 may determine whether a person sits on the second seat on the basis of information received through the communication unit 810. When it is determined that a person sits on the second seat, the processor 870 may limit generation of the control command. In other words, the control command may be generated only when no person sits on the second seat. This is to avoid inconvenience of an occupant who sits on the second seat.

The processor 870 may generate a control command to change to the determined seat position (S1330). The control command is transmitted through the communication unit 810 to an actuator that generates an external force such that the seat position of the seat is changed, and the actuator generates an external force according to the control command. As a result, the seat has the seat position determined by the processor 870.

Figure 14:
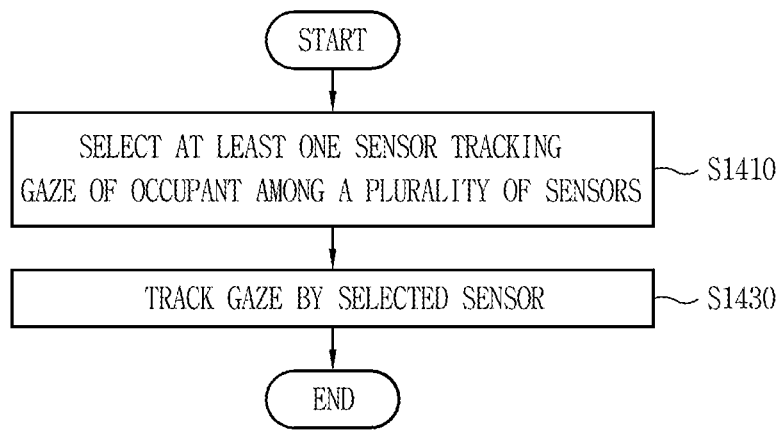
FIG. 14 is a flowchart illustrating a method of selecting a sensor to track a gaze of an occupant.

FIG. 14 is a flowchart illustrating a method of selecting a sensor to track a gaze of an occupant.

The processor 870 may select at least one sensor that tracks a gaze of the occupant from among a plurality of sensors (S1410). Furthermore, the processor 870 may track the gaze with the selected sensor (S1430).

The at least one sensor may be varied according to a seat position of a seat on which the occupant sits.

For example, the vehicle may be equipped with a first sensor and a second sensor installed at different positions to track the gaze of the occupant.

The processor 870 sets the screen by using sensing information received from the first sensor when the seat position satisfies the first condition, and sets the screen by using the sensing information received from the second sensor when the seat position satisfies the second condition.

The first condition and the second condition may be defined by at least one of a position of the seat in the vehicle and an angle between the first portion of the seat where the hips of the occupant touches and the second portion of the seat where the back touches.

The first sensor may be disposed on a front side of the vehicle, and the second sensor may be disposed on the rear side of the vehicle.

The processor 870 may detect the gaze of the occupant by using the first sensing information generated by the first sensor. When the gaze of the occupant is not detected from the first sensing information, the processor 870 may detect the gaze of the occupant by using the second sensing information generated by the second sensor. In other words, the processor 870 may selectively use any one of the plurality of sensors according to whether the gaze of the occupant is detected.

Figure 15:
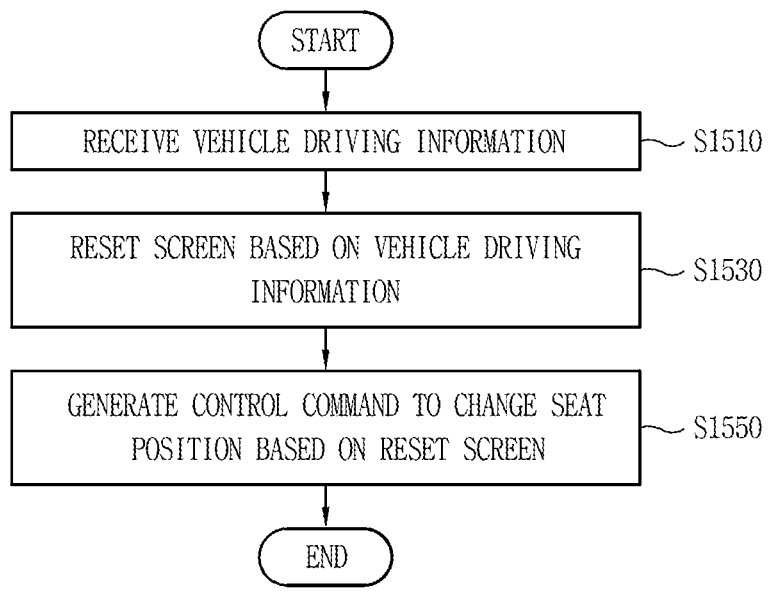
FIG. 15 is a flowchart illustrating a method of resetting a screen according to driving of a vehicle.

FIG. 15 is a flowchart illustrating a method of resetting a screen according to driving of a vehicle.

The processor 870 receives vehicle driving information through the communication unit 810 (S1510).

The communication unit 810 receives vehicle driving information from one or more electronic devices mounted on the vehicle.

The vehicle driving information includes vehicle information and surrounding information of the vehicle. Information related to the inside of the vehicle may be defined as vehicle information and information related to the outside of the vehicle as the surrounding information on the basis of the frame of the vehicle 100. Since the vehicle driving information has been described above with reference to FIG. 8, a detailed description thereof will be omitted.

The processor 870 resets the screen on the basis of the vehicle driving information (S1530).

For example, when the vehicle is scheduled to change the driving mode from an autonomous driving state to a manual driving state, the screen may be reset regardless of the gaze of the occupant for safety of the occupant.

As another example, when the vehicle enters a curved section or is scheduled to enter the curved section, the head of the occupant may be inclined with respect to a direction of gravity due to a centrifugal force. The processor 870 may reset at least one of the size, position, and shape of the screen depending on an inclined degree of the head or an estimated inclined degree of the head.

The processor 870 may generate a control command to change the seat position on the basis of the reset screen (S1550). Specifically, the processor 870 may generate a control command on the basis of the reset screen such that the seat position of the seat on which the occupant sits is changed. This is to allow the gaze of the occupant to be directed to the reset screen and to correct the posture of the occupant.

Figure 16:
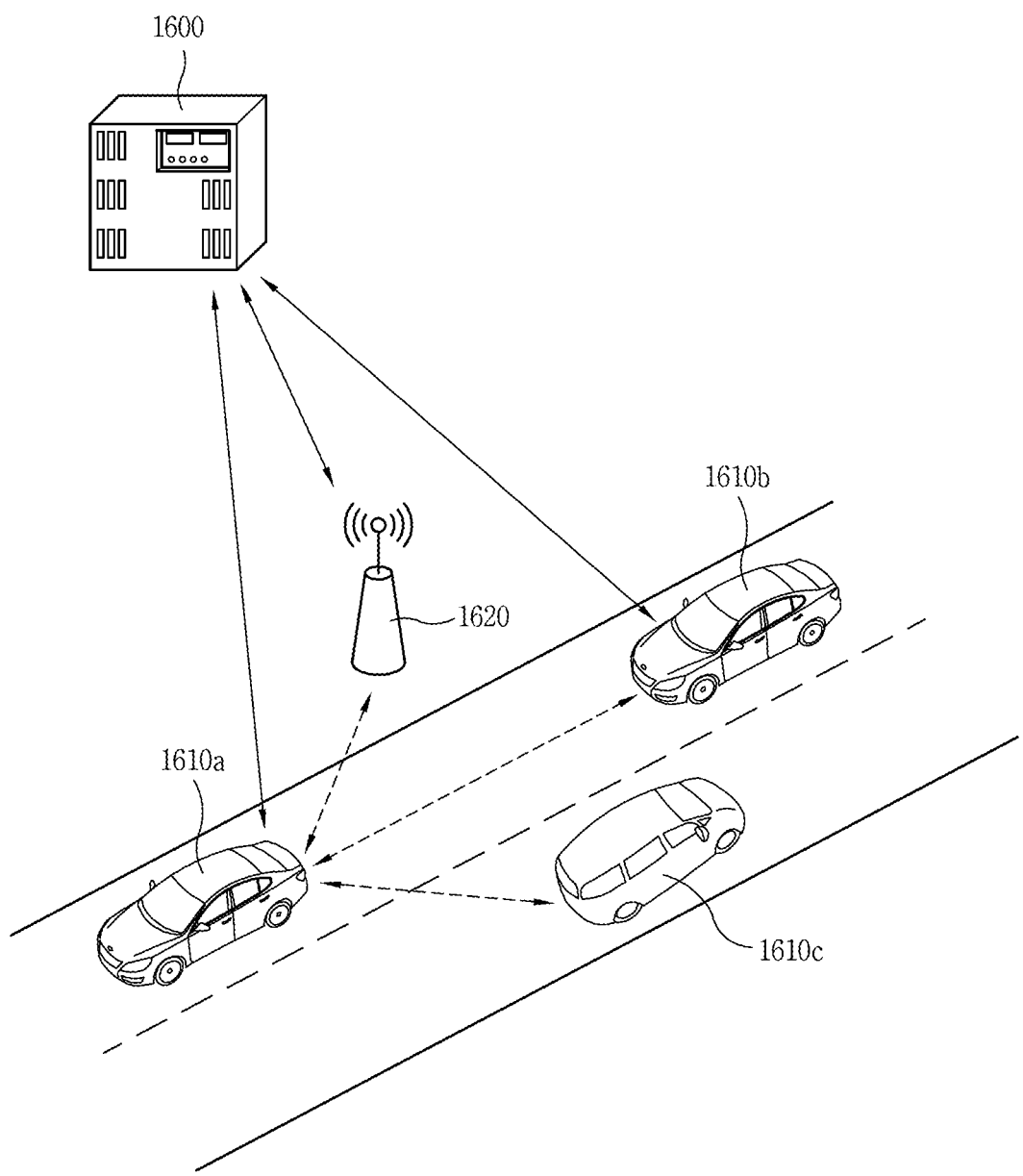
FIG. 16 is a block diagram illustrating a communication system for performing communication with a plurality of vehicles, a server, and a base station.

FIG. 16 is a block diagram illustrating a communication system for performing communication with a plurality of vehicles, a server, and a base station.

The image output device 800 may communicate with a vehicle control device 1600 that controls the vehicle 100.

The vehicle control device 1600 may be mounted on a vehicle to control the vehicle and may remotely control the vehicle by using a wireless network in a state where the vehicle control device 1600 is not mounted on the vehicle.

The vehicle control device 1600 may control a 5G network-to-vehicle autonomous driving operation using fifth generation communication. When the vehicle including an autonomous driving module transmits specific information to the 5G network, the vehicle control device 1600 may determine whether the vehicle is remotely controlled in the 5G network and transmit information (or a signal) related to remote control through the 5G network to the vehicle.

At least one component (hereinafter, simply referred to as an image output device) described above with reference to FIG. 7 including the image output device 800 may perform an initial access process or random access to a 5G network.

When performing the initial access, the image output device 800 may perform a process such as cell search for downlink DL and system information acquisition. Thereafter, various information to be output by the image output device 800 may be received from the vehicle control device 1600. For example, content to be output on the screen, a position to output the content, a seat position to be changed when the content is output, and the like may be transmitted from the vehicle control device 1600 to the image output device 800.

When performing the random access, the image output device 800 may receive an uplink grant (UL Grant) from the 5G network and transmit various information to the vehicle control device 1600 on the basis of the uplink (UL). The image output device 800 may receive an uplink grant (UL grant) through a physical downlink control channel (PDCCH).

The vehicle control device 1600 may correspond to a server, a base station, or an infrastructure of a V2I, communicate with one or more vehicles 1610a to 1610c and generate a control message for controlling each vehicle.

For example, the vehicle control device 1600 receives first vehicle driving information generated by a first vehicle 1610a from the first vehicle 1610a, and generate a control message for controlling the first vehicle 1610a on the basis of the first vehicle driving information.

The control message may be associated with various control functions such as setting a destination of the first vehicle 1610a, changing a driving mode, controlling a brake or an engine/motor to change a speed, or controlling a steering device to change a driving direction. The image output device according to the present invention provides an optimal user interface to the occupant using 5G communication in a vehicle capable of performing autonomous driving. The image output device may be a robot having artificial intelligence.

The present invention can be implemented as computer-readable codes in a program-recorded medium. The computer-readable medium may include all types of recording devices each storing data readable by a computer system.

Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. An image output device mounted on a vehicle, the image output device comprising:
an image output unit; and
a processor configured to:
set a screen in the vehicle based on a gaze of an occupant in the vehicle, and
control the image output unit to output an image corresponding to the screen,
wherein at least one of a size or a ratio of the image is varied according to the screen,
wherein the vehicle includes a first seat on which the occupant sits and a second seat on which the occupant does not sit, and
wherein the processor is configured to generate a first control command such that a seat position of the second seat is changed based on the screen being formed on the second seat.

2. The image output device of claim 1, wherein
the processor is configured to set a size of the screen differently based on an object viewed by the occupant.

3. The image output device of claim 2, further comprising:
a sensor configured to generate sensing information related to the object,
wherein the processor is configured to set an area that satisfies a reference condition using the sensing information as the screen.

4. The image output device of claim 3, wherein:
the sensing information includes an object image corresponding to the object, and
the processor is configured to (i) search for one or more rectangular areas that may be recognized as a two-dimensional plane by the occupant using the object image and (ii) set any one of the one or more rectangular areas as the screen.

5. The image output device of claim 2, further comprising:
a communication unit configured to communicate with a sensor mounted in the vehicle to generate sensing information related to the object,
wherein the processor is configured to set an area satisfying a reference condition using the sensing information as the screen.

6. The image output device of claim 1, further comprising:
a camera,
wherein an image output area in which an image is output is searched by using a camera image received from the camera, and the image output area is controlled such that the image output area is rectangle.

7. The image output device of claim 1, wherein
the screen is varied according to a seat position of the first seat.

8. The image output device of claim 1, wherein the processor is configured to generate a second control command such that a seat position of the first seat is changed based on the screen.

9. The image output device of claim 1, wherein the processor is configured to:
calculate a distance between the image output unit and the screen, and
control the image output unit so that a size of a graphic object included in the image is varied according to the distance.

10. The image output device of claim 1, further comprising:
a communication unit configured to communicate with a plurality of sensors mounted in the vehicle,
wherein the processor is configured to select at least one sensor tracking a gaze of the occupant from among the plurality of sensors, and the at least one sensor is varied according to the seat position of the first seat.

11. The image output device of claim 10, wherein:
the vehicle includes a first sensor and a second sensor installed at different positions and tracking a gaze of the occupant, and
the processor is configured to, based on the seat position of the first seat satisfying a first condition, set the screen using sensing information received from the first sensor, and
the processor is configured to, based on the seat position of the first seat satisfying a second condition, set the screen using sensing information received from the second sensor.

12. The image output device of claim 11, wherein
the first condition and the second condition are defined by at least one of a position of the first seat in the vehicle and an angle between a first portion of the first seat where the butt of the occupant touches and a second portion of the first seat where the back of the occupant touches.

13. The image output device of claim 11, wherein
the first sensor is disposed on a front side in the vehicle and the second sensor is disposed on a rear side in the vehicle.

14. The image output device of claim 10, wherein:
the vehicle includes a first sensor and a second sensor for tracking a gaze of the occupant, and
the processor is configured to:
detect a gaze of the occupant using first sensing information generated by the first sensor, and
detect the gaze of the occupant using second sensing information generated by the second sensor based on a gaze of the occupant not being detected from the first sensing information.

15. The image output device of claim 1, further comprising:
a communication unit configured to receive vehicle driving information from one or more electronic devices mounted on the vehicle,
wherein the processor is configured to:
reset the screen based on the vehicle driving information, and
control the image output unit to output the image on the reset screen.

16. The image output device of claim 15, wherein
the processor is configured to generate a third control command based on the reset screen such that the seat position of the first seat is changed.

17. The image output device of claim 1, wherein the image output device is installed on a head rest of the first seat.

18. The image output device of claim 1, wherein the seat position of the second seat is varied according to a gaze of the occupant.

19. The image output device of claim 1, wherein the processor is configured to stop generation of the first control command based on a person sitting on the second seat.

* * * * *